(12) United States Patent
Raman

(10) Patent No.: US 6,289,312 B1
(45) Date of Patent: Sep. 11, 2001

(54) SPEECH INTERFACE FOR COMPUTER APPLICATION PROGRAMS

(75) Inventor: T. V. Raman, Cambridge, MA (US)

(73) Assignee: Digital Equipment Corporation, Maynard, MA (US)

( * ) Notice: Subject to any disclaimer, the term of this patent is extended or adjusted under 35 U.S.C. 154(b) by 0 days.

(21) Appl. No.: 08/538,087

(22) Filed: Oct. 2, 1995

(51) Int. Cl.[7] ........................................................ G10L 3/00
(52) U.S. Cl. ............................ 704/270; 704/275; 704/266
(58) Field of Search ................................... 395/2.79, 2.84

(56) References Cited

U.S. PATENT DOCUMENTS

| | | | |
|---|---|---|---|
| 5,157,384 | * 10/1992 | Greanias et al. | 340/706 |
| 5,222,189 | * 6/1993 | Fielder | 395/2 |
| 5,261,079 | * 11/1993 | Celi, Jr. | 395/500 |
| 5,386,494 | * 1/1995 | White | 395/2.84 |
| 5,483,618 | * 1/1996 | Johnson et al. | 395/2.79 |
| 5,617,526 | * 4/1997 | Oran et al. | 395/326 |

OTHER PUBLICATIONS

Schmandt et al., ("Augmenting a Window System with speech input", IEEE Compuer, 8/90, pp. 50–56) Aug. 1990.*

* cited by examiner

Primary Examiner—Allen R. MacDonald
Assistant Examiner—Vijay B. Chawan
(74) Attorney, Agent, or Firm—Dirk Brinkman

(57) ABSTRACT

In a computer system, a method enables an application program to interact aurally with a user. The application program including calls to perform input and output. The calls include parameters. The method identifies functions of an input/output driver. The functions are called by the calls of the application program. The functions are augmented to process the parameters according to an execution context of the application program. The augmented functions are linked to speech processing modules. The speech processing modules generating aural output dependent on the parameters of the calls and the execution context of the application program. The speech processing modules include speak line, speak word, speak letter, speak icon modules for generating the aural output as spoken lines, words, and letters. In addition, the aural output can be modified by voice, personality, and background modules. Graphic icons can be rendered as distinctive sounds.

7 Claims, 4 Drawing Sheets

SPEECH INTERFACE FOR COMPUTER APPLICATION PROGRAMS

FIELD OF THE INVENTION

This invention relates generally to computer systems, and more particularly to computer systems that are operated interactively by users.

BACKGROUND OF THE INVENTION

A traditional computer system typically uses visual communication to interact with the user. For example, most application programs are designed to display output on a monitor screen. In response to viewing the output, the user enters commands to control the application program.

The complexity of the visual output has increased substantially with modem application programs. Consider the many programs that use windows, pull-down menus, tool bars, icons, slide buttons, pointers, multiple fonts, underlining, change bars, bolding, color cues, timers, and status bars, often all on a single display screen. The intent is to make user interaction with the application easier.

However, many currently available computing devices, which could be used to access modem applications interactively, such as hand-held personal digital assists and palm-top computers, have limited display capabilities. Also, the most widely available communication device, the telephone, typically has none. In addition, in certain environments where computers are used there may be light restrictions which preclude a visual interaction with the user, and certain users may prefer to have some, if not all of the interaction with the application program be in anything but visual mode. Consequently, in many instances, the increased visual complexity of modem applications has decreased their accessibility for user interaction. Therefore, it is desired to have modem application programs interact with users in other communication modes.

For example, some prior art application programs have been modified to provide some, if not all of the output in aural mode. Then, a relatively unsophisticated loudspeaker or earphones can replace the color graphic display monitor. However, it is a problem to modify application programs, and in most cases, application programs are not accessible for user modification. With mass produced "shrink-wrap" software, it is economically and technically impracticable to enable all applications for non-visual user interaction.

Instead of modifying application programs, it is known that screen readers can be used to provide spoken output for application programs. Prior art screen-readers typically intercept the character stream that is communicated to the monitor by the application program. The intercepted characters are converted to audible letters, and where possible, a contiguous set of characters are spoken as words or sentences. Special embedded control characters that are intended to format the display are converted into distinctive sounds.

Screen-readers are generally designed to operate separately from the application program. Thus, as an advantage, screen-readers can often be used with many applications programs without making any modifications to the application programs themselves. However, the user is entirely responsible for interpreting what the application is trying to convey, and how the sounds relate to the displayed images. In other words, the context of the application with respect to the arrangement of the displayed output is lost by screen-readers.

In addition, traditional screen-readers are difficult to adapt to modem display monitors. Modem display monitors use a bit stream instead of a character stream to create a screen image. The screen image, or graphic user interface, is generated from a bit pattern stored in a memory as pixels. The on and off states of the bits of the pixels determine how the information is presented. In designing screen-readers for use with graphic display systems, for example, IBM OS/2, Microsoft Windows 3.1, and Unix X-Windows, a significant effort is expended in extracting meaningful information from a complex graphic display, and constructing data structures to form a model of what is being displayed. However, in most cases, recovering the full application context from spoken words remains difficult.

As an additional drawback, most commercial screen-readers are designed to operate in a specific operating system environment, for example, DOS. This makes it difficult to use the screen-readers with applications designed for other widely used operating systems such as UNIX. Typically, the prior art screen-readers execute on a stand-alone PC running in terminal emulation mode. The PC is usually connected to the output driver used by the application programs. As a result, the screen-readers slavishly regurgitate sounds independent of the application context.

For example, an appointment calendar application program can arrange the dates of the month as cells organized into rows and columns on the monitor. Each row of seven cells represents a week, and like days are vertically arranged in columns. The user wishing to book or look up an appointment must form a mental image of the entire display as the calendar is spoken by the screen-reader. Only then can the user determine, for example, "what day of the week is the third Sunday of March." To completely capture a mental image of the calendar, the user may have to "display" the month several times. In addition, the user may have to navigate through the cells using a cursor to determine the relative position of the cells. This is cumbersome and a waste of resources.

FIG. 1 shows a typical arrangement of a prior art speech enabled application programming system. An interactive application program 10 needs to interact with the user. Therefore, the application program 10 includes output calls 11 for generating output and soliciting input. Associated with the calls are parameters which indicate how the output and input should be handled.

A general purpose input/output (I/O) driver 20 includes processes or functions 22. The calls 11 of the application 10 transfer execution control to the functions 22. The functions 22, depending on the parameters of the calls 11 and the hardware characteristics of a monitor 30, generate "visual" output on line 21, and receive input. The output and input can be in the form of a digitally encoded character stream. A monitor 30 connected to the output driver 20 by line 21 converts the character stream to a displayed image 40. An input device, for example a keyboard or mouse, can be used to generate input.

In order to enable the application to "speak," a screen-reader 50 is also connected to line 21. Typically, the screen-reader executes on a stand-alone computer emulating a text terminal. The screen-reader 50 receives as input the same visual output generated by the functions 22 of the output driver 20, e.g., the character stream. The screen-reader 50 generates aural output on line 51. The aural output can also be in the form of an encoded character stream. A speech synthesizer 60 connected to the screen-reader 50 by line 51 processes the aural output to produce speech 70, hopefully, representative of the image 40.

In this arrangement, the screen-reader 50 merely intercepts the characters of the visual output without regard to the context of the application 10 when the calls 11 are made. Consequently, known screen-readers cannot provide the user with any application specific assistance to interpret the spoken words. Therefore, users listening to the output must attempt to build a mental picture of the image 40 on the screen from the letters and words of the speech 70. However, if the application uses specific arrangements of the words and letters to convey meaning, then it is difficult to determine how the spoken words relate to that arrangement and what responses are appropriate to interact with the application.

Therefore, there is a need for a speech interface which integrates the spoken words with the context of an application program as the program is executing. The interface should provide rich, context-sensitive feedback to the user so that interaction with the application program can be facilitated. In addition, the interface should be usable without modifying the underlying application program.

SUMMARY OF THE INVENTION

A method operating in a computer system enables an application program to interact aurally with a user. The application program includes calls to perform input and output. The calls include parameters. The method identifies functions of an input/output driver of the computer system. The functions of the input/output driver generate the output and receive the input. The functions are called by the calls of the application program.

In one aspect of the invention, the functions are augmented to process the parameters according to an execution context of the application program. The augmented functions are linked to speech processing modules. The speech processing modules generate aural output dependent on the parameters of the calls and the execution context of the application program. In another aspect of the invention, the speech processing modules include speak line, speak word, speak letter, speak icon modules for generating the aural output as spoken lines, words, and letters. In addition, the aural output can be modified by voice, personality, and background modules. Graphic icons can be rendered as distinctive sounds.

DETAILED DESCRIPTION OF A PREFERRED EMBODIMENT

Figure 1:
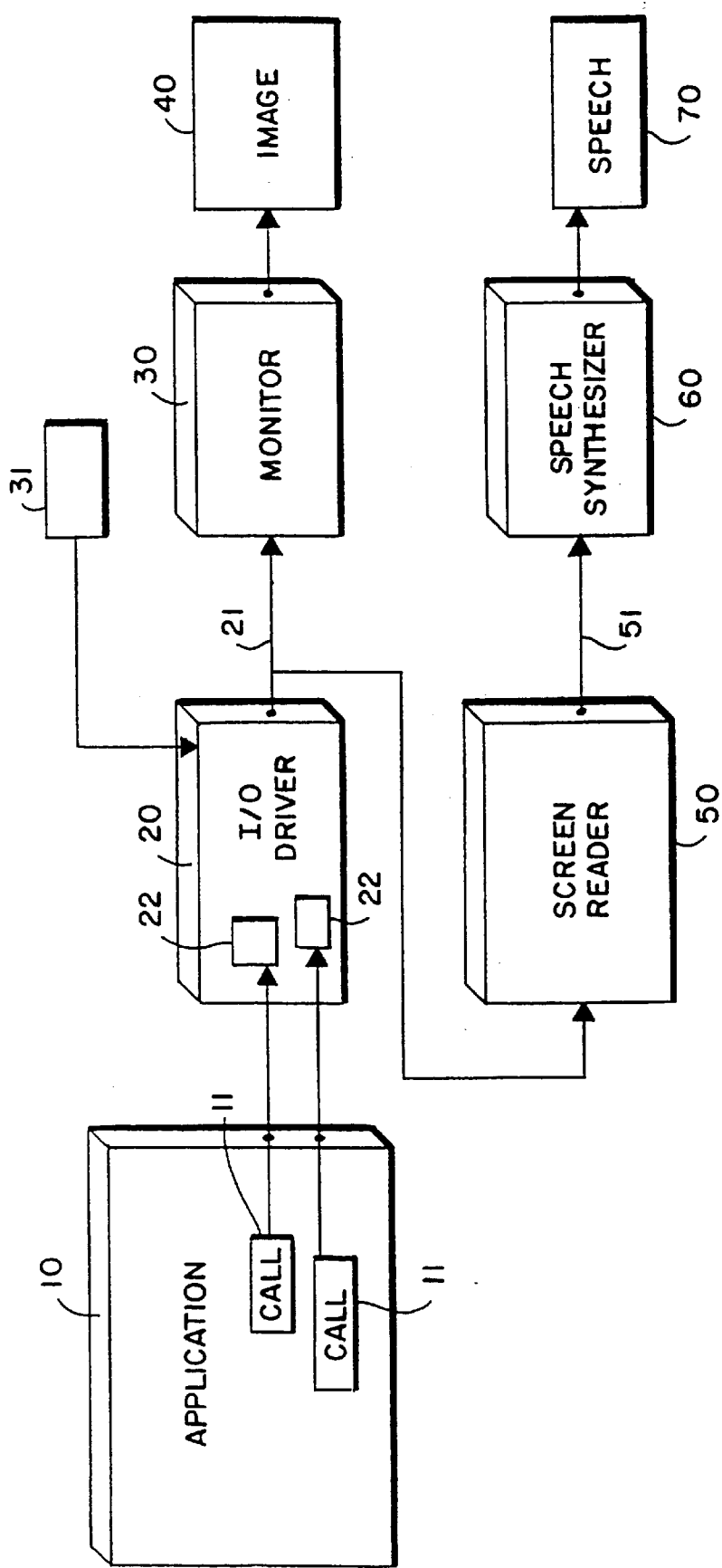
FIG. 1 is a block diagram of a prior art speech enabled application programming system.
Figure 2:
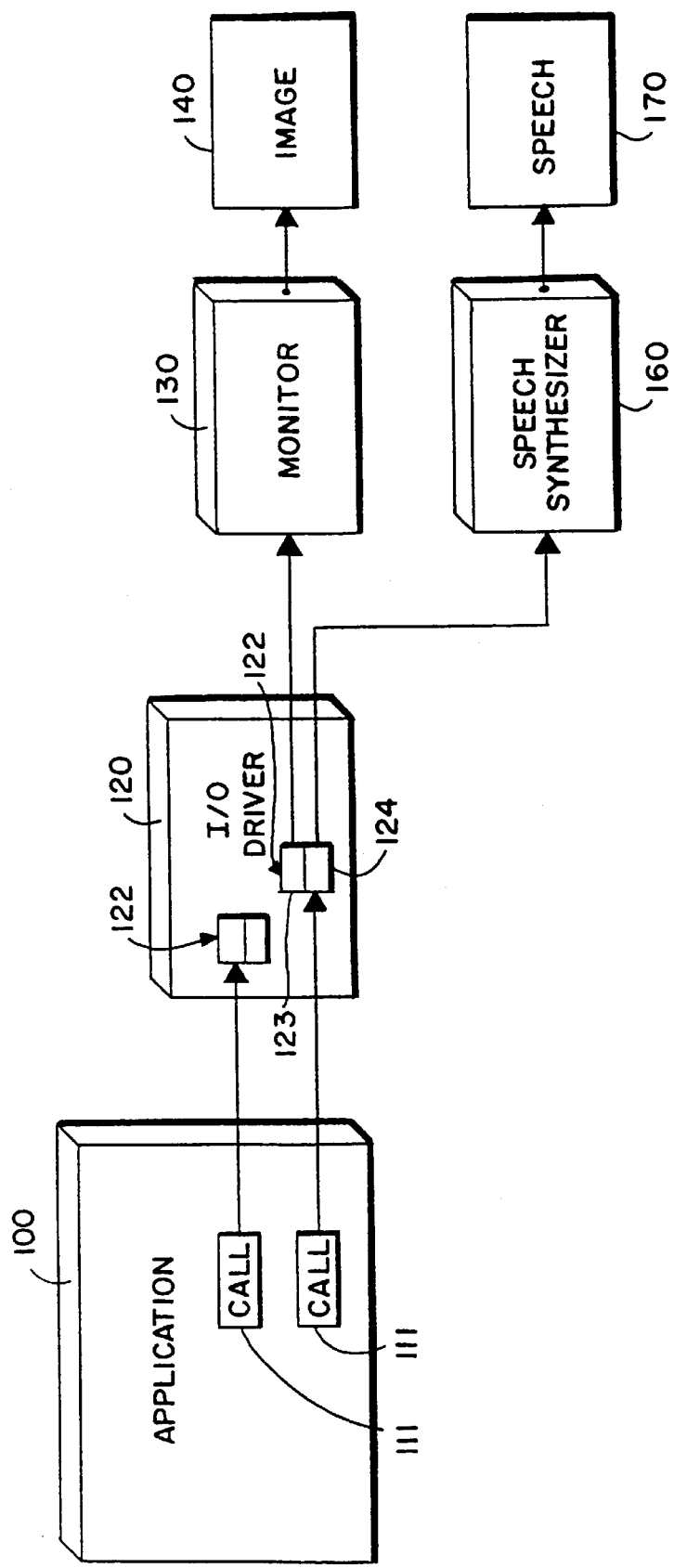
FIG. 2 is a block diagram of an application programming system enabled for speech according to a preferred embodiment of the invention.

Now, with reference to the drawings, FIG. 2 shows an application program 100 of a computer system. The application program 100 includes function calls 111. The calls 111 are used to provide interaction with users of the application 100. The interaction may generate output. The exact form of the output for a particular instant call is controlled by parameters associated with the calls 111. The parameters can include the output text, as well as control information that is used to format the appearance and location of the text when it is displayed. The output may also direct the user to supply input information.

Connected to the application 100 is a general purpose input/output (I/O) driver 120. The driver 120 includes processes or functions 122. Executing one of the calls 111 in the application 100 transfers execution control to a corresponding one of the functions 122. The function 122 reads the parameters and generates visual output accordingly. The output can be consumed by a monitor 130 to update an image 140 of the monitor 130.

In a preferred embodiment of the invention, the functions 122 are augmented to provide output which can also be rendered aurally. For example, a first visual portion 123 of the function generates traditional visual output. A second aural portion 124 of the function 122 generates audible output which can be processed by a speech synthesizer 160 to produce speech 170.

As an advantage over the prior art, the functions 122 can be augmented to more completely convey the application context which is generating the display. Methods for augmenting the functions 122 according to a preferred embodiment of the invention are explained in greater detail below. The second aural portions 124 of the functions 122 can take into consideration the execution state of the application program 100 at the time the calls 111 are executed and format the aural output accordingly.

Figure 3:
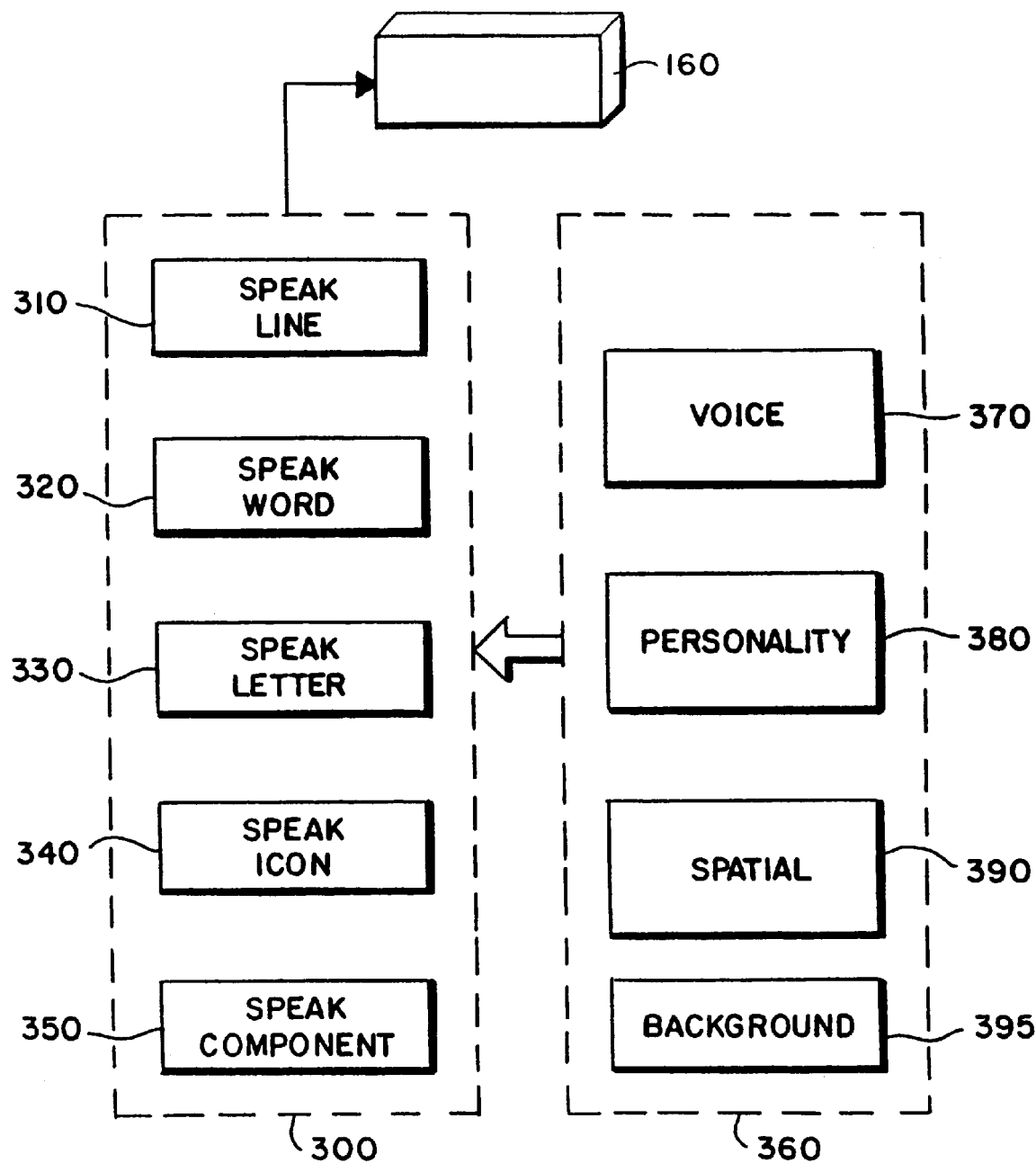
FIG. 3 is a block diagram of processing modules used with the system of FIG. 2.

FIG. 3 shows processing modules which can be used by the second aural portions 124 of the functions 122 of FIG. 2. The modules include core modules 300 that provide basic speech functionality. The core modules 300 can include a speak line module 310, a speak word module 320, a speak letter module 330, a speak icon module 340, and one or more application specific speak component modules 350.

The speak line, word, and letter modules 310, 320, and 330 generate aural output for corresponding visual components such as lines, words, and letters. The speak icon module 340 generates distinctive sounds, e.g., gong, bell, whistle, and the like, which differentiate the various graphical components such as icons which may be generated by the application program 100 of FIG. 2. The sounds can be digitally encoded in an icon database accessible by the icon module 340.

The application specific speak component modules 350 can be designed to speak certain application output in an enhanced manner. For example, if the visual display includes cells in rows and columns, a speak cell component module can speak the "content" of the cell and the relationship of the cell in the total arrangement. For example, if the application is a spreadsheet, a cell component module could say: "profit for January is ten million" when the user positions the cursor on one cell. This alleviates the need for the listener to poke around on the screen to determine exactly what the content "ten million" means. A screen-reader would only speak the content as the cell is being displayed. The relationship of the content to the entire spreadsheet would be difficult to discern.

For a calendar application, instead of just saying that the date is the twenty-third, as a prior art screen-reader would, a date component module could say: "Tuesday, the twenty-third of March." Now, the user can immediately realize the current output in context of what the application is displaying.

If the underlying application call is a user prompt for input, a screen-reader would just say the prompt text. It may not be apparent that the purpose of the text is to elicit, as a next interactive step, user input. However, a speak prompt component could say: "please enter" followed by the text, so that it is readily obvious that input is requested by the application.

In addition to the core modules 300, the second aural portions 124 of the functions 122 can access speech modifier modules 360. The speech modifier modules 360 can include a voice module 370, a personality module 380, a spatial module 390, and a background module 395. The modifier modules 360 interact with the core modules 300 to alter the manner in which the speech is delivered. The alterations can be used to mimic visual cues such as, bolding, underlining, color, and fonts. For example, bolded text could be spoken in a deeper male voice, whereas, underlined italic text could be spoken in a higher pitched female voice. Prompts can be spoken with a rising inflection, and so forth. For a spell check application, the interface can only speak the lines containing mis-spelled words, and the mis-spelled words of the line can be spoken in a different tone of voice.

The spatial module 390 can, using stereophonic output, give additional audible cues. For example, World-Wide-Web (WWW) browser applications such as Netscape or Mosaic, frequently retrieve text that includes links to other documents. The other documents may be located at distant client computer sites. By speaking the links in a manner which indicates relative distance to the linked document, the user can determine if in fact the link should be followed. If the application uses a mouse or keyboard controlled cursor, e.g., an icon, then the relative position of the cursor on the screen can be spatially indicated.

The background module 395 can be used to overlay additional background sounds over the spoken words. For example, in a windowing environment where the display may include several overlapped, or tiled windows, the content of the various windows can be spoken over different background audio tracks that differentiate the various windows. The operation of icons in a tool bar, or a slide button in a scroll bar can similarly be conveyed. For example, as the button is moved, the background pitch can vary.

In a preferred embodiment of the invention, an aural portion 124 of a function can be executed before or after the corresponding visual portion 123 is executed. Also, an aural portion can execute while the visual output is generated. Furthermore, if the visual output is lengthy, the corresponding aural portion of the function can allow for interruption of the output on predetermined conditions. Or, alternatively, the aural output can be suppressed or minimized until the visual output reaches a specific part of the text being displayed. This gives the user the capability of rapidly flipping through pages of output without being burdened with listening to text which is of no interest, as may be the case with a screen-reader.

Figure 4:
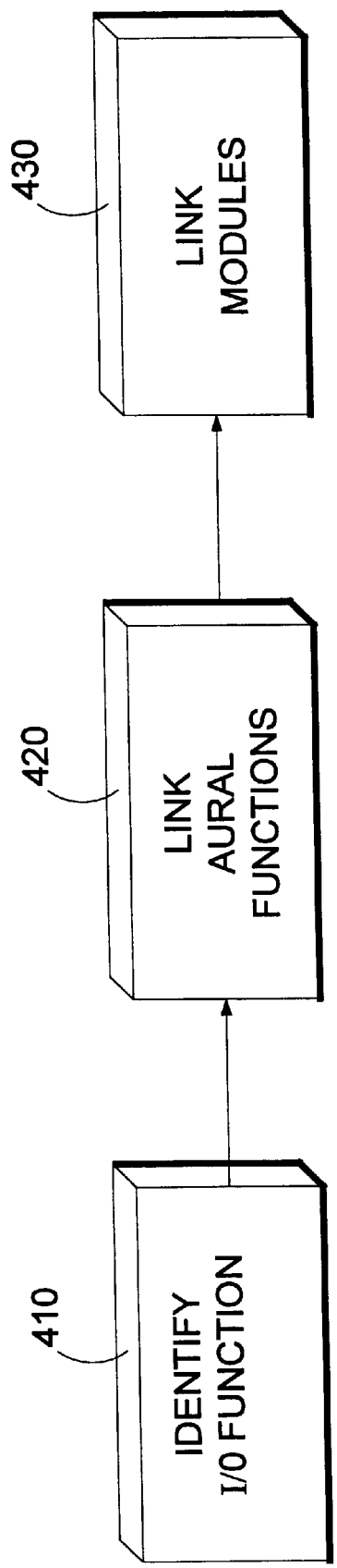
FIG. 4 is a flow diagram of a process for speech enabling an application.

FIG. 4 shows a preferred process for augmenting the functions 122 of the general purpose output driver 120 with the visual portions 124. In step 410, all interactive functions of the driver 120 are identified, e.g., all functions which are used by I/O calls of the application 100. This can be done from a relocation load map of the executable image of the driver 120. Alternatively, the functions can be identified in a dynamic link library (DLL). In step 420, the functions are linked to the visual portions 124 to execute either before, after, or during the execution of the visual functions 123. The aural portions 124 are linked to the core and modifier speech modules 300 and 360 in step 430.

The augmented portions 124 of the functions 122 can take into consideration execution and data states of the application 100. For example, the augmented portions can access data structures of the application to better convey in a spoken manner what is being displayed.

Although the invention has been described with respect to a user interacting with an application through local input/output devices such as monitor, and keyboard, it should be understood, that the invention can also be worked remotely using other types of I/O devices. For example, interaction with an application could take place telephonically. Here, the speech synthesizer is connected to a telephone network, and the user listens to the application over a telephone.

What is claimed is:

1. A computer implemented method for enabling an application program to aurally interact with a user, the application program including calls to perform input and output, the calls including parameters, comprising the steps of:

identifying functions of an input/output driver called by the calls of the application program;

augmenting the functions to process the parameters according to an execution context of the application program;

linking the augmented functions to speech processing modules, the speech processing modules generating aural output dependent on the parameters of the calls and the execution context of the application program.

2. The method of claim 1 wherein the speech processing modules include speak line, speak word, speak letter, speak icon modules for generating the aural output as spoken lines, words, and letters.

3. The method of claim 2 further comprising voice, personality, and background modules to modify the aural output of the speak line, speak word, and speak letters modules dependent on the context of the application program.

4. The method of claim 2 further comprising rendering graphic icons as distinctive sounds.

5. The method of claim 1 further comprising:

overlaying background sounds over the aural output.

6. A computer implemented method for adding aural interaction to an application program, wherein said application program includes programed calls to perform textual or graphic output, the calls including parameters, comprising the steps of:

identifying functions of an input/output driver called by the calls of the application program;

augmenting the functions to process the parameters according to the context of the execution of the calls in the application program;

linking the augmented functions to speech processing modules, the speech processing modules generating aural output dependent on the parameters of the calls and the execution context of the application program.

7. A method as in claim 6 further comprising the step of adding a pre-programmed background sound to said aural output depending upon a predetermined context of execution.

* * * * *